United States Patent
Sarin et al.

(10) Patent No.: US 12,334,818 B2
(45) Date of Patent: Jun. 17, 2025

(54) DC-DC POWER CONVERTER PRE-CHARGE SYSTEM

(71) Applicant: GM GLOBAL TECHNOLOGY OPERATIONS LLC, Detroit, MI (US)

(72) Inventors: Akshay Sarin, Auburn Hills, MI (US); Alan B. Martin, Washington, MI (US); Joseph Berg, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 17/984,166

(22) Filed: Nov. 9, 2022

(65) Prior Publication Data

US 2024/0154528 A1    May 9, 2024

(51) Int. Cl.
*H02M 3/155* (2006.01)
*H02M 1/00* (2006.01)

(52) U.S. Cl.
CPC ......... *H02M 3/155* (2013.01); *H02M 1/0009* (2021.05)

(58) Field of Classification Search
CPC ....... H02M 3/155; H02M 1/0009; H02M 1/32
See application file for complete search history.

(56) References Cited

U.S. PATENT DOCUMENTS

| | | | | |
|---|---|---|---|---|
| 7,919,728 | B2* | 4/2011 | Era | B23K 9/092 |
| | | | | 219/130.21 |
| 10,044,209 | B2* | 8/2018 | Namou | H02J 7/00714 |
| 12,103,429 | B1* | 10/2024 | Gibbs | H01M 10/482 |
| 12,132,303 | B2* | 10/2024 | Mehraeen | H02H 3/021 |
| 2007/0108959 | A1 | 5/2007 | Amano | |
| 2019/0074556 | A1* | 3/2019 | Onoda | H01M 10/425 |

FOREIGN PATENT DOCUMENTS

| | | |
|---|---|---|
| CN | 201069461 Y | 6/2008 |
| CN | 206306853 U | 7/2017 |
| DE | 10220255 A1 | 12/2002 |
| DE | 102007048620 A1 | 4/2008 |
| JP | 2012223061 A | 11/2012 |
| WO | 2020099082 A1 | 5/2020 |

\* cited by examiner

*Primary Examiner* — Kyle J Moody
(74) *Attorney, Agent, or Firm* — Quinn IP Law (57) ABSTRACT

A pre-charge system for a DC electric power system includes a high-voltage electric power bus that electrically connects to an external bus. A contactor includes a first switch arranged to control electric power through the positive bus link, and a second switch arranged to control electric power through the negative bus link. A pre-charge resistor is arranged in parallel with the first switch. A controller is operatively connected to the first and second switches, and in communication with a voltage sensor. The controller includes an instruction set to activate the second switch, periodically monitor the electrical potential, determine a time-rate of change in the electrical potential, and close the first switch when the time-rate of change in the electrical potential is less than a first threshold.

20 Claims, 5 Drawing Sheets

DC-DC POWER CONVERTER PRE-CHARGE SYSTEM

INTRODUCTION

Electric power systems may employ DC-DC power converters to increase voltage levels of DC electric power that is output from a DC electric power source, which may be transferred to an electric power system.

SUMMARY

The concepts described herein provide a system, apparatus, and/or method for controlling and managing electrical pre-charging in a DC electric power system. The DC electric power source may be a fuel cell device, a photovoltaic panel, or an ultracapacitor in one embodiment. Alternatively, the DC electric power source may be a rechargeable energy storage device.

An aspect of the disclosure may include a pre-charge system for a DC electric power system that includes a high-voltage electric power bus composed as a positive bus link and a negative bus link, wherein the high-voltage electric power bus electrically connects to an external bus via the positive bus link and the negative bus link; a contactor including a first switch arranged to control electric power through the positive bus link, and a second switch arranged to control electric power through the negative bus link; a pre-charge resistor, the pre-charge resistor being arranged in parallel with the first switch; a voltage sensor arranged to monitor electrical potential between the positive bus link and the negative bus link; and a controller. The controller is operatively connected to the first and second switches, and in communication with the voltage sensor. The controller includes an instruction set that is executable to activate the second switch, periodically monitor the electrical potential, determine a time-rate of change in the electrical potential, and close the first switch when the time-rate of change in the electrical potential is less than a first threshold.

Another aspect of the disclosure may include the instruction set being executable to monitor an elapsed time starting from activation of the second switch; and open the second switch when the elapsed time from activation of the second switch is greater than a time threshold and the time-rate of change in the electrical potential is greater than the first threshold.

Another aspect of the disclosure may include the instruction set being executable to indicate a fault when the second switch is opened.

Another aspect of the disclosure may include a timer; wherein the instruction set is executable to initiate the timer coincident with activation of the second switch; and periodically monitor the electrical potential only when the timer exceeds a time threshold.

Another aspect of the disclosure may include a non-rechargeable DC electric power source, wherein the non-rechargeable DC electric power source is electrically connected to the positive bus link and the negative bus link of the high-voltage electric power bus.

Another aspect of the disclosure may include the non-rechargeable DC electric power source being one of a fuel cell stack or a photovoltaic panel.

Another aspect of the disclosure may include a pre-charge system for a DC electric power system consisting of: a high-voltage power bus composed as a positive bus link and a negative bus link, wherein the high-voltage power bus electrically connects to an external bus via the positive bus link and the negative bus link; a contactor including a first switch arranged to control electric power through the positive bus link, and a second switch arranged to control electric power through the negative bus link; a pre-charge resistor, the pre-charge resistor being arranged in parallel with the first switch; a voltage sensor arranged to monitor electrical potential between the positive bus link and the negative bus link; and a controller, the controller operatively connected to the first and second switches, and in communication with the voltage sensor.

An aspect of the disclosure may include a pre-charge system for a DC electric power system that includes a high-voltage electric power bus composed as a positive bus link and a negative bus link, wherein the high-voltage electric power bus electrically connects to an external bus via the positive bus link and the negative bus link; a contactor including a first switch arranged to control electric power through the positive bus link, and a second switch arranged to control electric power through the negative bus link; a pre-charge resistor, the pre-charge resistor being arranged in parallel with the second switch; a voltage sensor arranged to monitor electrical potential between the positive bus link and the negative bus link; and a controller. The controller is operatively connected to the first and second switches, and in communication with the voltage sensor. The controller includes an instruction set that is executable to activate the second switch, periodically monitor the electrical potential, determine a time-rate of change in the electrical potential, and close the first switch when the time-rate of change in the electrical potential is less than a first threshold.

An aspect of the disclosure may include a pre-charge system for a DC electric power system that includes a high-voltage electric power bus composed as a positive bus link and a negative bus link, wherein the high-voltage electric power bus electrically connects to an external bus via the positive bus link and the negative bus link; a contactor including a first switch arranged to control electric power through the positive bus link, and a second switch arranged to control electric power through the negative bus link; a pre-charge resistor, the pre-charge resistor being arranged in parallel with the first switch; a current sensor arranged to monitor electrical current in the positive bus link; and a controller. The controller is operatively connected to the first and second switches, and in communication with the current sensor. The controller includes an instruction set that is executable to activate the second switch, periodically monitor the electrical current, determine a time-rate of change in the electrical current, and close the first switch when the time-rate of change in the electrical current is less than a first threshold.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawing, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 1:
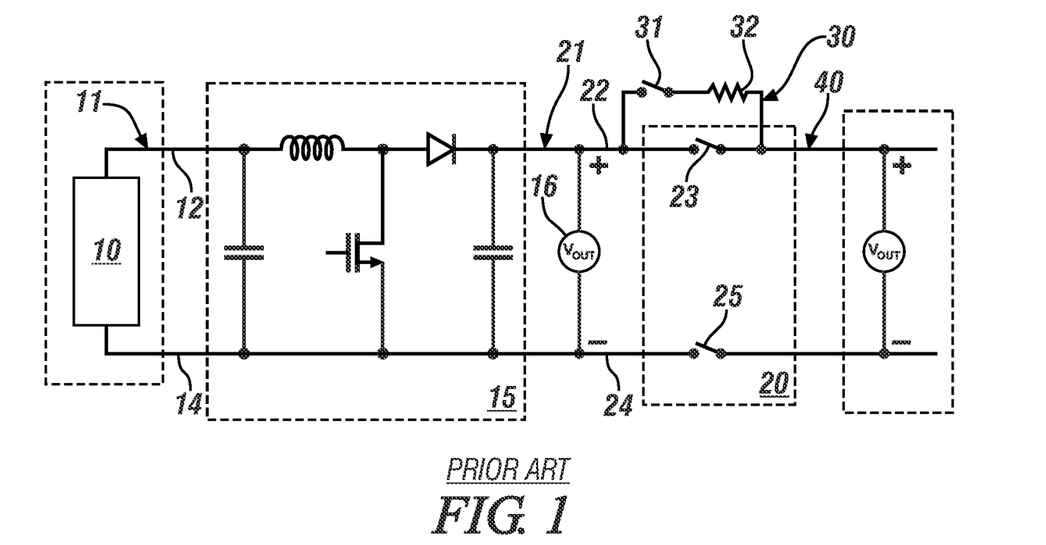
FIG. 1 schematically illustrates an embodiment of a prior art electric power transfer system, which includes a DC electric power source, a DC-DC power converter, and a known pre-charge circuit, and electrically connects to and supplies DC electric power to another electrical system, in accordance with the disclosure.

FIG. 1 schematically illustrates a known electric power transfer system for transferring DC electric power from a DC electric power source 10 to a DC electric power system. The electric power transfer system includes a power source bus 11, a power bus including a positive link 12 and a negative link 14, a switching DC-DC power converter 15 (e.g., a boost converter), an output bus 21 that connects to an external bus 40 via a contactor circuit 20 and a known pre-charge circuit 30.

The output bus 21 includes a positive link 22 having a first in-line contactor switch 24 and a negative link 23 having a second in-line contactor switch 25.

The known pre-charge circuit 30 is arranged in parallel with the first in-line contactor switch 24 and includes a pre-charge switch 31 that is arranged in series with a pre-charge resistor 32. The pre-charge switch 31, the first in-line contactor switch 24, and the second in-line contactor switch 25 are controlled by a controller.

Figure 2:
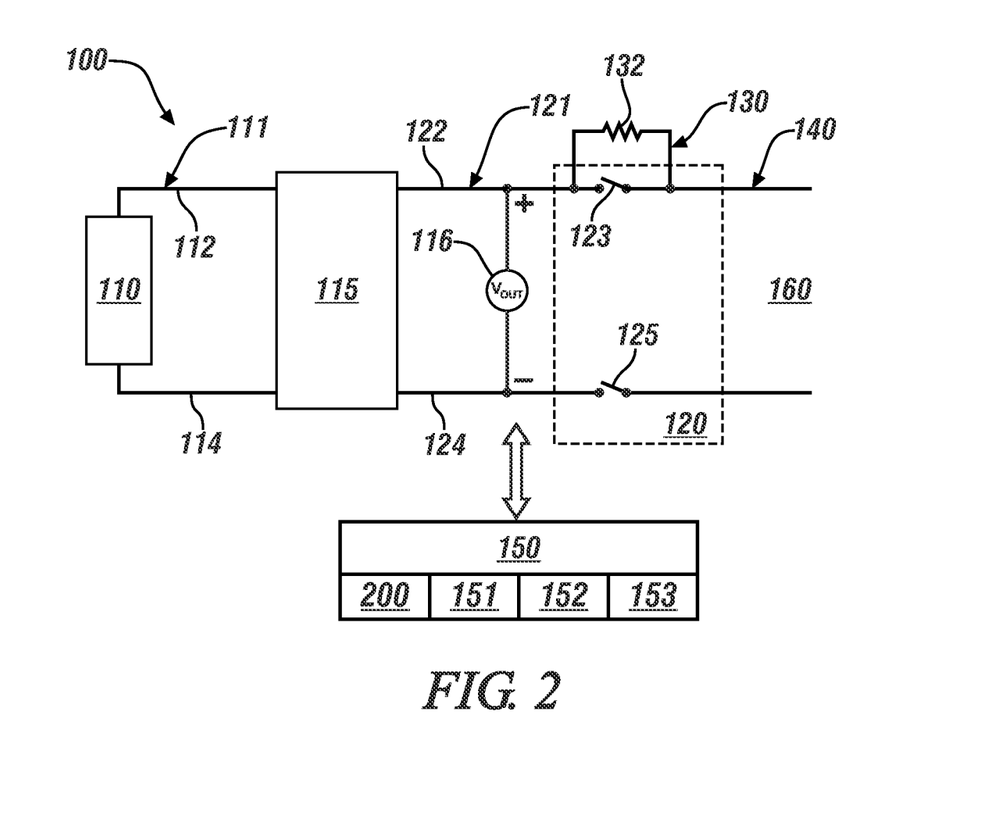
FIG. 2 schematically illustrates an embodiment of an electric power transfer system that includes a DC electric power source, a DC-DC power converter, a pre-charge circuit, and a controller, and is electrically connected to a second electrical system to supply power thereto, in accordance with the disclosure.

FIG. 2 schematically illustrates an embodiment of a novel DC electric power transfer system 100 for transferring DC electric power from a DC electric power source 110 to an external DC electric power system 160. The electric power transfer system 100 includes a power source bus 111, a switching DC-DC power converter 115, an output bus 121 that connects to an external bus 140 via a contactor circuit 120 and a pre-charge circuit 130. A controller 150 monitors a voltage potential in the power source bus 111 and controls, via control routine 200, the contactor circuit 120 and the pre-charge circuit 130 based thereon. In one embodiment, the electric power transfer system 100 is arranged on an electrified vehicle, wherein the DC electric power system 10 provides DC electric power at a preset voltage for use by one or multiple rotary electric machines to generate torque that is transferred to one or more vehicle wheels or propulsion devices for tractive effort. The electrified vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. In addition, the concepts described herein may be applied to a system in which an embodiment of the electric power transfer system 100 is arranged to supply electrical power to one or more stationary electric machines, such as a generator.

The DC electric power source 110 is a controllable electric power generating device that may be capable of controlling DC electric power, i.e., controlling current and/or voltage that is being transferred to the power source bus 111. The DC electric power source 110 further has an internal capacitance, in one embodiment. In one embodiment, the DC electric power source 110 is a non-rechargeable DC electric power source, meaning that it cannot be electrically recharged by an electrical charging unit. In one embodiment, the DC electric power source 110 is a fuel cell stack. In one embodiment, the DC electric power source 110 is a photovoltaic panel. In one embodiment, the DC electric power source 110 is an ultracapacitor. Alternatively, the DC electric power source 110 may be an electrochemical battery.

The DC electric power source 110 provides electrical power to the external DC electric power system 160 through the switching DC-DC power converter 115. The switching DC-DC power converter 115 may be either a step-up power converter or a step-down power converter that connects the DC electric power source 110 to the external DC electric power system 160 by changing the voltage and current from the DC electric power source 110 to a preset voltage level to make it electrically compatible to the external DC electric power system 160.

The DC electric power source 110 transfers electric power, parameterized as current and voltage, to the switching DC-DC power converter 115 via power source bus 111 having a positive link 112 and a negative link 114.

The switching DC-DC power converter 115 connects to the external DC electric power system 160 via output bus 121, contactor circuit 120, pre-charge circuit 130 and external bus 140. A power converter voltage sensor 116 monitors voltage output of electricity from the switching DC-DC power converter 115 upstream of the contactor circuit 120 and the pre-charge circuit 130 and the contactor circuit 120.

The output bus 121 includes a positive link 122 having a first in-line contactor switch 123 and a negative link 124 having a second in-line contactor switch 125.

The pre-charge circuit 130 is arranged in parallel with the first in-line contactor switch 123. The pre-charge circuit 130 includes a pre-charge resistor 132. The first in-line contactor switch 123 and the second in-line contactor switch 125 are controlled by controller 150.

The controller 150 includes processor (151), memory device(s) (152), analog-to-digital converter (153) and control routine 200. The controller 150 monitors signal inputs from one or multiple sensors, including the power converter voltage sensor 116. The controller 150 is operatively connected to the first and second in-line contactor switches 123, 125. The controller 150 may be in communication with another controller, which may command activation of the contactor circuit 120 to transfer electric power from the DC electric power source 110 to the external DC electric power system 160. The controller 150 executes algorithmic code including control routine 200 to control the first and second in-line contactor switches 123, 125 of the contactor circuit 120.

Figure 3:
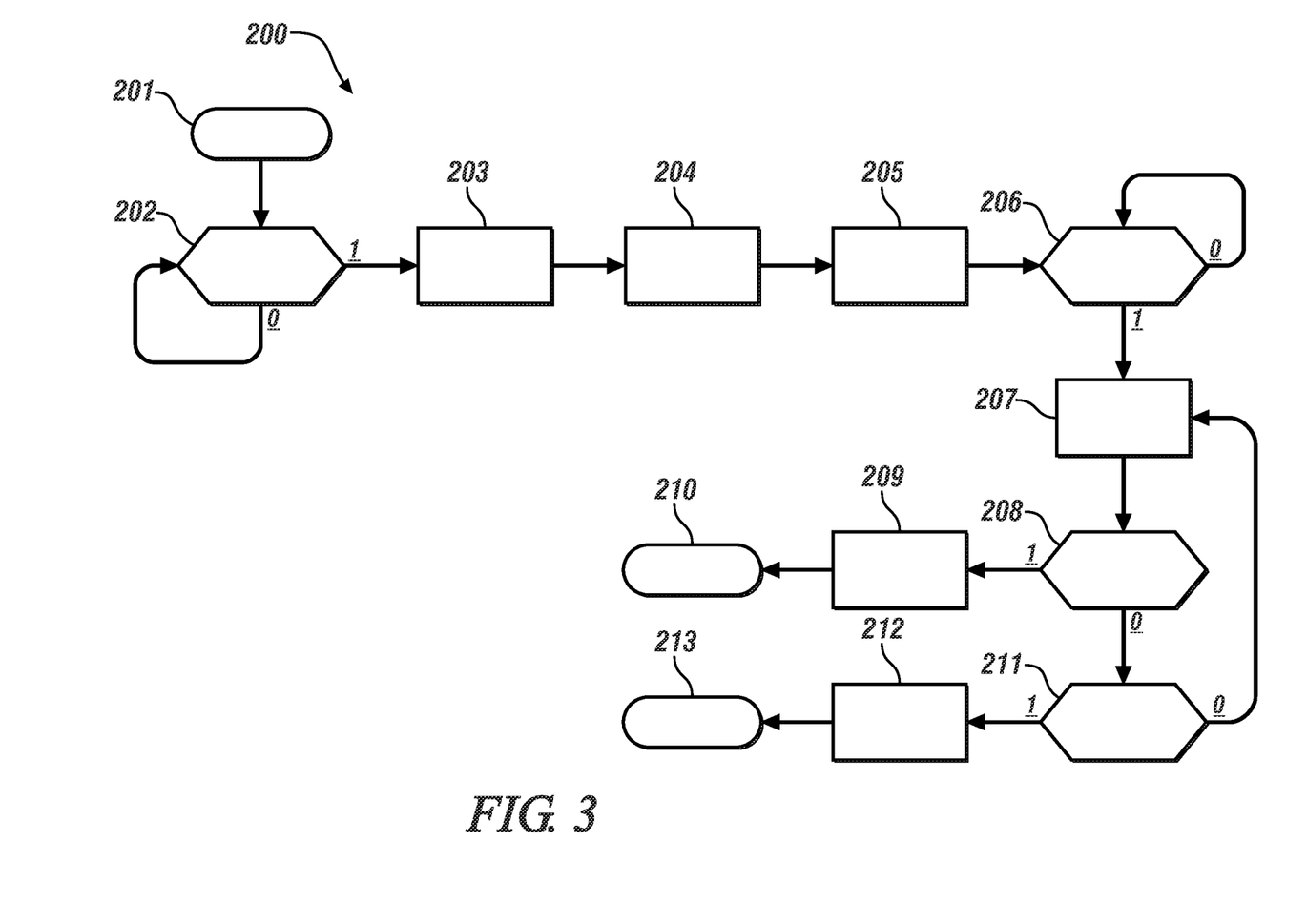
FIG. 3 schematically illustrates a control routine that is executable to control an embodiment of the electric power transfer system that is described with reference to FIG. 2, in accordance with the disclosure.

FIG. 3, with continued reference to the system of FIG. 2, schematically illustrates an embodiment of the control routine 200 for controlling operation of and embodiment of the electric power transfer system 100 that is described with reference to FIG. 2. Initially, the first in-line contactor switch 123 and the second in-line contactor switch 125 are controlled to an open state by controller 150 (Step 201). During operation, the controller 150 may be commanded to transfer electric power from the DC electric power source 110 to the external DC electric power system 160 (Step 202). When the controller 150 is commanded to transfer electric power from the DC electric power source 110 to the external DC electric power system 160 (Step 202)(1), output voltage is measured using the power converter voltage sensor 116 (Step 203), and the second in-line contactor switch 125 is controlled to a closed state (Step 204). A first timer and a second timer are initialized (Step 205).

The first timer is monitored (Step 206), and when it exceeds a first time threshold (206)(1), the output voltage is measured using the power converter voltage sensor 116 and counter k is incremented (Step 207). In one non-limiting example, the first time threshold is 200 ms.

The output voltage is compared to the output voltage from a previous step (Step 208), and when a differential voltage is less than or equal to a threshold differential voltage (Step 208)(1), the controller 150 closes or activates the first in-line contactor switch 123 (Step 209). By way of a non-limiting example, the threshold differential voltage is 10 Vdc. The routine 200 ends (Step 210) with electric power flowing to the external DC electric power system 160.

When the differential voltage is greater than the threshold differential voltage (Step 208)(0), the second timer is monitored (Step 211).

When the second timer is less than or equal to a second time threshold (Step 211)(0), the routine cycles back to Step 207. In one non-limiting example, the second time threshold is 300 ms.

When the second timer is greater than the second time threshold (Step 211)(1), the second in-line contactor switch 125 is deactivated, i.e., controlled to an open state (Step 212) and operation ends with a contactor fault code being set (Step 213).

The concepts described herein include a pre-charge system for a DC electric power system that includes a high-voltage electric power bus composed as a positive bus link and a negative bus link, wherein the high-voltage electric power bus electrically connects to an external bus via the positive bus link and the negative bus link; a contactor including a first switch arranged to control electric power through the positive bus link, and a second switch arranged to control electric power through the negative bus link; a pre-charge resistor, the pre-charge resistor being arranged in parallel with the first switch; a voltage sensor arranged to monitor electrical potential between the positive bus link and the negative bus link; and a controller. The controller is operatively connected to the first and second switches, and in communication with the voltage sensor. The controller includes an instruction set that is executable to activate the second switch, periodically monitor the electrical potential, determine a time-rate of change in the electrical potential, and close the first switch when the time-rate of change in the electrical potential is less than a first threshold.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter may be a discrete value (e.g., either "1" or "0"), a percentage (e.g., 0% to 100%), or an infinitely variable value.

Figure 4:
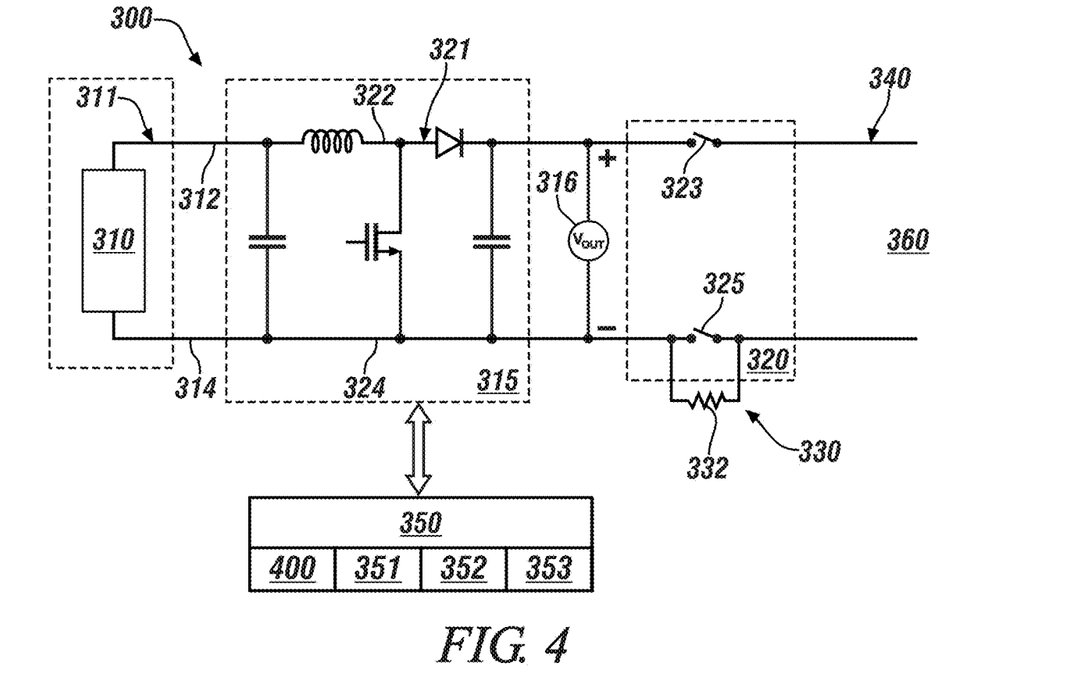
FIG. 4 schematically illustrates another embodiment of an electric power transfer system that includes a DC electric power source, a DC-DC power converter, a pre-charge circuit, and a controller, and is electrically connected to a second electrical system to supply power thereto, in accordance with the disclosure.

FIG. 4 schematically illustrates an embodiment of a novel electric power transfer system 300 for transferring DC electric power from a DC electric power source 310 to an external DC electric power system 360. The electric power transfer system 300 includes a power source bus 311, a switching DC-DC power converter 315, an output bus 321 that connects to an external bus 340 via a contactor circuit 320 and a pre-charge circuit 330. A controller 350 monitors a voltage potential in the output bus 311 and controls, via control routine 200, the contactor circuit 320 and the pre-charge circuit 330 based thereon. In one embodiment, the electric power transfer system 300 is arranged on an electrified vehicle, wherein the DC electric power system 360 provides DC electric power at a preset voltage for use by one or multiple rotary electric machines to generate torque that is transferred to one or more vehicle wheels or propulsion devices for tractive effort. The electrified vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. In addition, the concepts described herein may be applied to a system in which an embodiment of the electric power transfer system 300 is arranged to supply electrical power to one or more stationary electric machines, such as a generator.

The DC electric power source 310 is a controllable electric power generating device that may be capable of controlling DC electric power, i.e., controlling current and/or voltage that is being transferred to the power source bus 311. The DC electric power source 310 further has an internal capacitance, in one embodiment. In one embodiment, the DC electric power source 310 is a non-rechargeable electric power source, meaning that it cannot be electrically recharged by an electrical charging unit. In one embodiment, the DC electric power source 310 is a fuel cell stack. In one embodiment, the DC electric power source 310 is a photovoltaic panel. In one embodiment, the DC electric power source 310 is an ultracapacitor. Alternatively, the DC electric power source 310 may be an electrochemical battery.

The DC electric power source 310 provides electrical power to the external DC electric power system 360 through the switching DC-DC power converter 315. The switching DC-DC power converter 315 may be either a step-up power converter or a step-down power converter that connects the DC electric power source 310 to the external DC electric power system 360 by changing the voltage and current from the DC electric power source 310 to a preset voltage level to make it electrically compatible to the external DC electric power system 360.

The DC electric power source 310 transfers electric power, parameterized as current and voltage, to the switching DC-DC power converter 315 via power source bus 311 having a positive link 312 and a negative link 314.

The switching DC-DC power converter 315 connects to the external DC electric power system 360 via output bus 321, contactor circuit 320, pre-charge circuit 330 and external bus 340. A power converter voltage sensor 316 monitors voltage output of electricity from the switching DC-DC power converter 315 upstream of the contactor circuit 320 and the pre-charge circuit 330.

The output bus 321 includes a positive link 322 having a first in-line contactor switch 323 and a negative link 324 having a second in-line contactor switch 325.

The pre-charge circuit 330 is arranged in parallel with the second in-line contactor switch 325. The pre-charge circuit 330 includes a pre-charge resistor 332. The first in-line contactor switch 323 and the second in-line contactor switch 325 are controlled by controller 350.

The controller 350 includes processor (351), memory device(s) (352), analog-to-digital converter (353) and control routine 400. The controller 350 monitors signal inputs from one or multiple sensors, including the power converter voltage sensor 316. The controller 350 is operatively connected to the first and second in-line contactor switches 323, 325. The controller 350 may be in communication with another controller, which may command activation of the contactor circuit 320 to transfer electric power from the DC electric power source 310 to the external DC electric power system 360. The controller 350 executes algorithmic code including control routine 200 to control the first and second in-line contactor switches 323, 325 of the contactor circuit 320.

Figure 5:
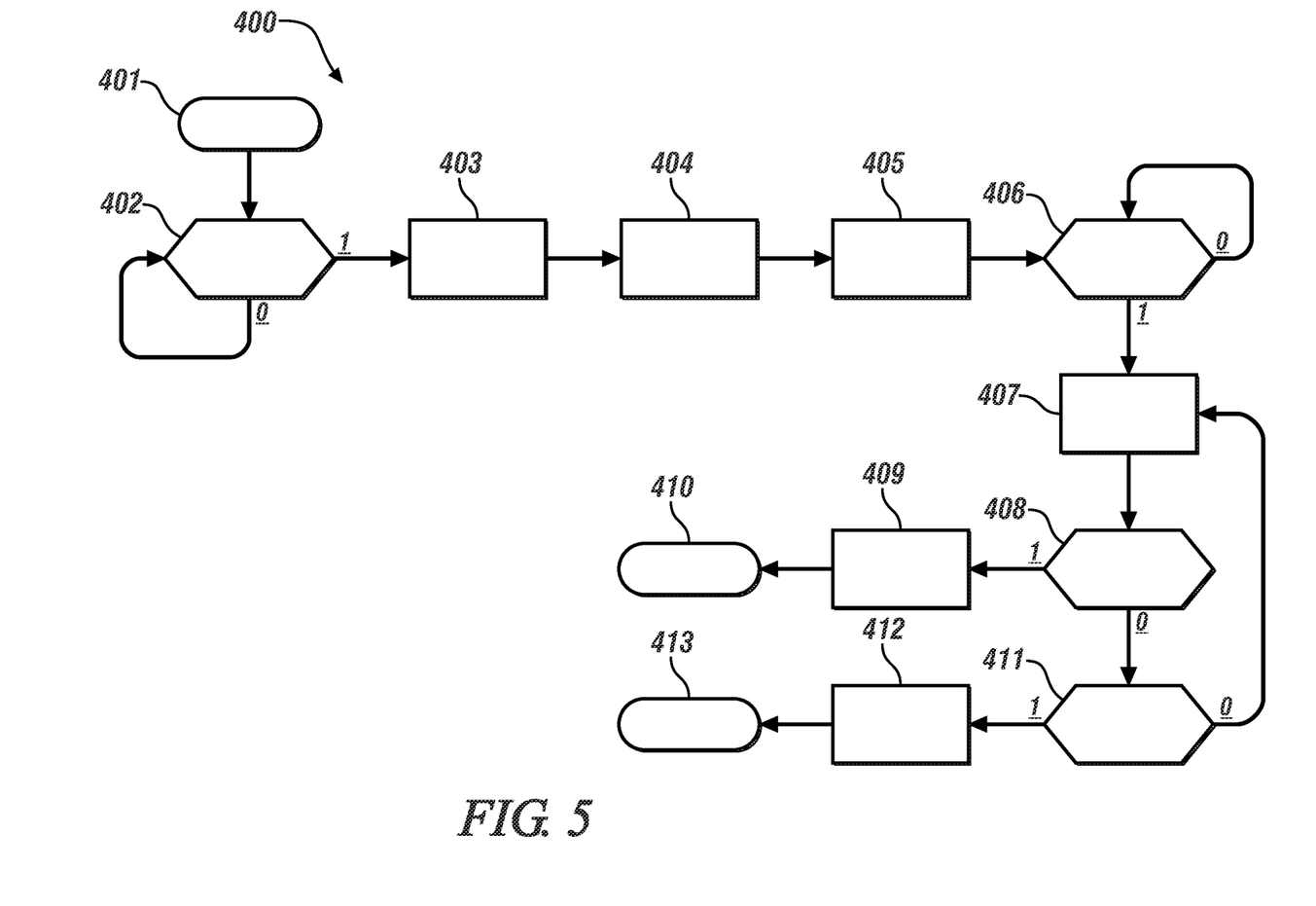
FIG. 5 schematically illustrates a control routine that is executable to control an embodiment of the electric power transfer system that is described with reference to FIG. 4, in accordance with the disclosure.

FIG. 5, with continued reference to the system of FIG. 4, schematically illustrates an embodiment of the control routine 400 for controlling operation of and embodiment of the electric power transfer system 300 that is described with reference to FIG. 4. Initially, the first in-line contactor switch 323 and the second in-line contactor switch 325 are controlled to an open state by controller 350 (Step 401). During operation, the controller 350 may be commanded to transfer electric power from the DC electric power source 310 to the external DC electric power system 360 (Step 402). When the controller 350 is commanded to transfer electric power from the DC electric power source 310 to the external DC electric power system 360 (Step 402)(1), output voltage is measured using the power converter voltage sensor 316 (Step 403), and the first in-line contactor switch 323 is controlled to a closed state (Step 404). A first timer and a second timer are initialized (Step 405).

The first timer is monitored (Step 406), and when it exceeds a first time threshold (406)(1), the output voltage is measured using the power converter voltage sensor 316 and counter k is incremented (Step 407). In one non-limiting example, the first time threshold is 400 ms.

The output voltage is compared to the output voltage from a previous step (Step 408), and when a differential voltage is less than or equal to a threshold differential voltage (Step 408)(1), the controller 350 closes or activates the second in-line contactor switch 325 (Step 409). By way of a non-limiting example, the threshold differential voltage is 10 Vdc. The routine 400 ends (Step 410) with electric power flowing to the external DC electric power system 360.

When the differential voltage is greater than the threshold differential voltage (Step 408)(0), the second timer is monitored (Step 411).

When the second timer is less than or equal to a second time threshold (Step 411)(0), the routine cycles back to Step 407. In one non-limiting example, the second time threshold is 300 ms.

When the second timer is greater than the second time threshold (Step 411)(1), the second in-line contactor switch 325 is deactivated, i.e., controlled to an open state (Step 412) and operation ends with a contactor fault code being set (Step 413).

Figure 6:
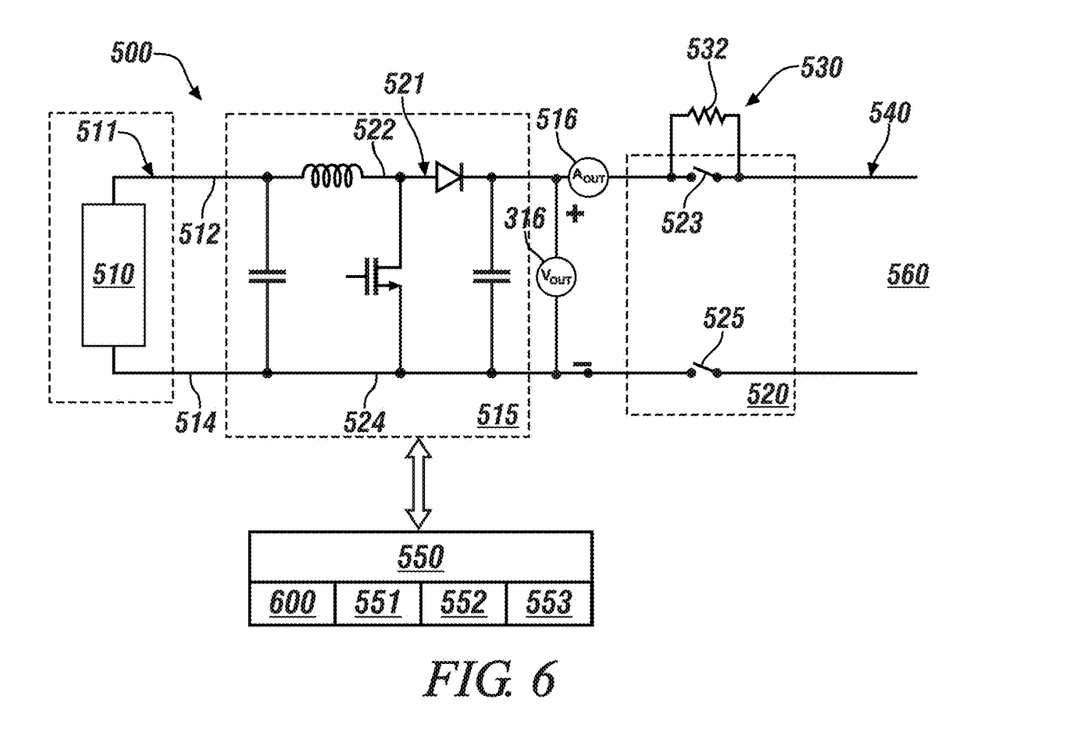
FIG. 6 schematically illustrates another embodiment of an electric power transfer system that includes a DC electric power source, a DC-DC power converter, a pre-charge circuit, and a controller, and is electrically connected to a second electrical system to supply power thereto, in accordance with the disclosure.

FIG. 6 schematically illustrates an embodiment of a novel electric power transfer system 500 for transferring DC electric power from a DC electric power source 510 to an external DC electric power system 560. The electric power transfer system 500 includes a power source bus 511, a switching DC-DC power converter 515, an output bus 521 that connects to an external bus 540 via a contactor circuit 520 and a pre-charge circuit 530. A controller 550 monitors a voltage potential in the output bus 511 and controls, via control routine 200, the contactor circuit 520 and the pre-charge circuit 530 based thereon. In one embodiment, the electric power transfer system 500 is arranged on an electrified vehicle, wherein the external DC electric power system 560 provides DC electric power at a preset voltage for use by one or multiple rotary electric machines to generate torque that is transferred to one or more vehicle wheels or propulsion devices for tractive effort. The electrified vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. In addition, the concepts described herein may be applied to a system in which an embodiment of the electric power transfer system 500 is arranged to supply electrical power to one or more stationary electric machines, such as a generator.

The DC electric power source 510 is a controllable electric power generating device that may be capable of controlling DC electric power, i.e., controlling current and/or voltage that is being transferred to the power source bus 511. The DC electric power source 510 further has an internal capacitance, in one embodiment. In one embodiment, the DC electric power source 510 is a non-rechargeable DC electric power source, meaning that it cannot be electrically recharged by an electrical charging unit. In one embodiment, the DC electric power source 510 is a fuel cell stack. In one embodiment, the DC electric power source 510 is a photovoltaic panel. In one embodiment, the DC electric power source 510 is an ultracapacitor. Alternatively, the DC electric power source 510 may be an electrochemical battery.

The DC electric power source 510 provides electrical power to the external DC electric power system 560 through the switching DC-DC power converter 515. The switching DC-DC power converter 515 may be either a step-up power converter or a step-down power converter that connects the DC electric power source 510 to the external DC electric power system 560 by changing the voltage and current from the DC electric power source 510 to a preset voltage level to make it electrically compatible to the external DC electric power system 560.

The DC electric power source 510 transfers electric power, parameterized as current and voltage, to the switching DC-DC power converter 515 via power source bus 511 having a positive link 512 and a negative link 514.

The switching DC-DC power converter 515 connects to the external DC electric power system 560 via output bus 521, contactor circuit 520, pre-charge circuit 530 and external bus 540. A power converter current sensor 516 monitors voltage output of electricity from the switching DC-DC power converter 515 upstream of the contactor circuit 520 and the pre-charge circuit 530 and the contactor circuit 520. In one embodiment, A power converter voltage sensor 316 is arranged to monitor voltage output of electricity from the switching DC-DC power converter 515 upstream of the contactor circuit 520 and the pre-charge circuit 530.

The output bus 521 includes a positive link 522 having a first in-line contactor switch 523 and a negative link 524 having a second in-line contactor switch 525.

The pre-charge circuit 530 is arranged in parallel with the first in-line contactor switch 523. The pre-charge circuit 530 includes a pre-charge resistor 532. The first in-line contactor switch 523 and the second in-line contactor switch 525 are controlled by controller 550.

The controller 550 includes processor (551), memory device(s) (552), analog-to-digital converter (553) and control routine 400. The controller 550 monitors signal inputs from one or multiple sensors, including the power converter current sensor 516. The controller 550 is operatively connected to the first and second in-line contactor switches 523, 525. The controller 550 may be in communication with another controller, which may command activation of the contactor circuit 520 to transfer electric power from the DC electric power source 510 to the external DC electric power system 560. The controller 550 executes algorithmic code including control routine 200 to control the first and second in-line contactor switches 523, 525 of the contactor circuit 520.

Figure 7:
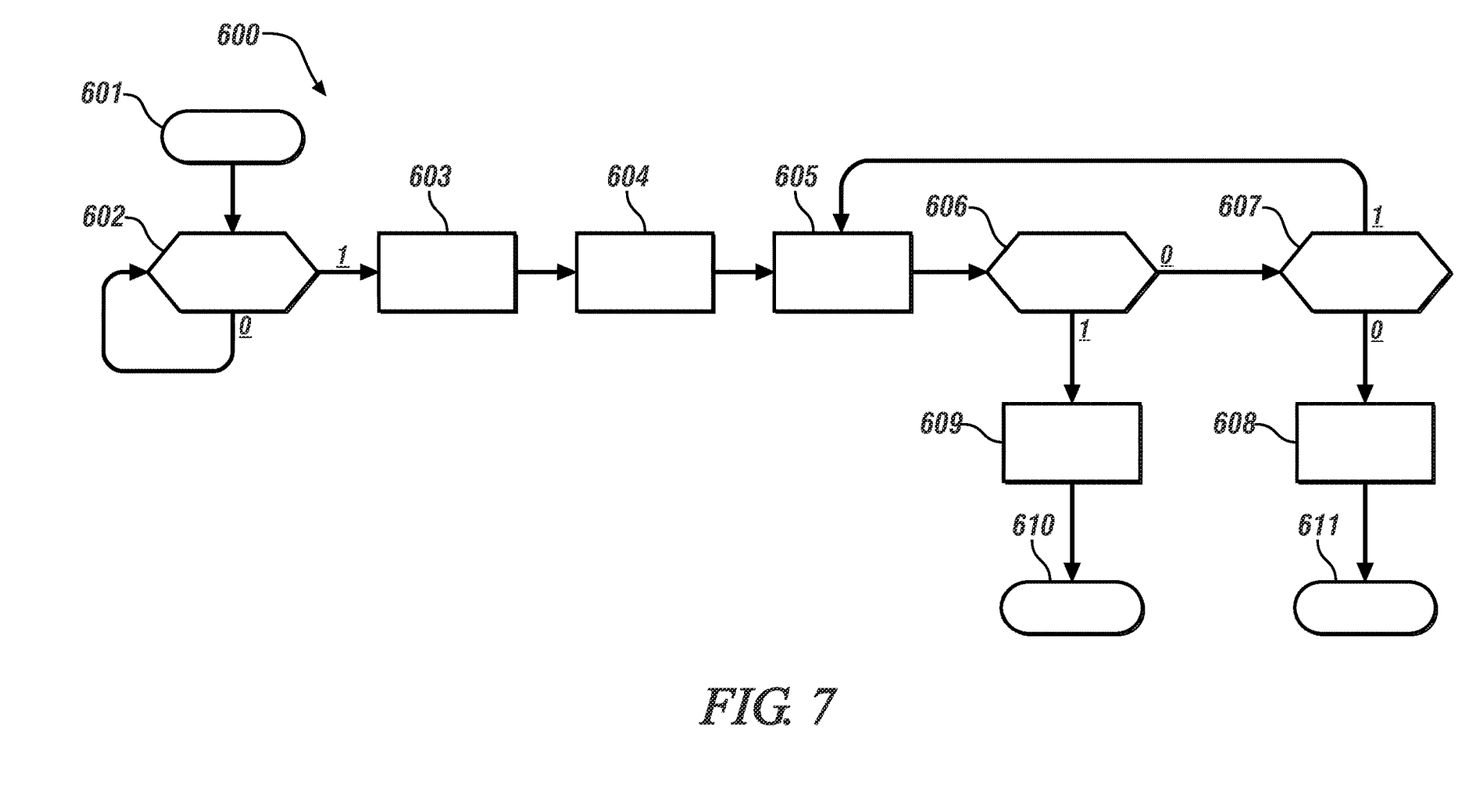
FIG. 7 schematically illustrates a control routine that is executable to control an embodiment of the electric power transfer system that is described with reference to FIG. 6, in accordance with the disclosure.

FIG. 7, with continued reference to the system of FIG. 6, schematically illustrates an embodiment of the control routine 400 for controlling operation of and embodiment of the electric power transfer system 500 that is described with reference to FIG. 6. Initially, the first in-line contactor switch 523 and the second in-line contactor switch 525 are controlled to an open state by controller 550 (Step 601). During operation, the controller 550 may be commanded to transfer electric power from the DC electric power source 510 to the external DC electric power system 560 (Step 602), which includes controlling the second in-line contact switch 525 to a closed state (Step 603) and initializing a first timer and a second timer (Step 604). When the controller 550 is commanded to transfer electric power from the DC electric power source 510 to the external DC electric power system 560 (Step 602)(1), output current is measured using the power converter current sensor 516 (Step 605).

The current is monitored (Step 606), and when it exceeds a first current threshold (606)(1), the controller 550 closes or activates the first in-line contactor switch 523 (Step 609). By way of a non-limiting example, the current threshold is calibratable, and is 10 A in one embodiment. The routine 600 ends (Step 610) with electric power flowing to the external DC electric power system 560.

When the current does not exceed the first current threshold (606)(0), the first timer is evaluated to determine if it is greater than a threshold time (607). In one non-limiting example, the threshold time is 300 ms.

When the first timer is less than the threshold time (607)(1), the system loops back to Step 605.

When the first timer is greater than the threshold time (607)(0), the second in-line contactor switch 525 is deactivated, i.e., controlled to an open state (Step 608) and operation ends with a contactor fault code being set (Step 611).

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A pre-charge system for a DC electric power system, the pre-charge system comprising:
    a high-voltage electric power bus composed as a positive bus link and a negative bus link, wherein the high-voltage electric power bus electrically connects to an external bus via the positive bus link and the negative bus link;
    a contactor including a first switch arranged to control electric power through the positive bus link, and a second switch arranged to control electric power through the negative bus link;
    a pre-charge resistor, the pre-charge resistor being arranged in parallel with the first switch;
    a voltage sensor arranged to monitor electrical potential between the positive bus link and the negative bus link; and
    a controller, the controller operatively connected to the first and second switches, and in communication with the voltage sensor, the controller including an instruction set, the instruction set being executable to:
        activate the second switch;
        periodically monitor the electrical potential;
        determine a time-rate of change in the electrical potential; and
        close the first switch when the time-rate of change in the electrical potential is less than a first threshold.

2. The pre-charge system of claim 1, further comprising the instruction set being executable to:
    monitor an elapsed time starting from activation of the second switch; and
    open the second switch when the elapsed time from activation of the second switch is greater than a time threshold and the time-rate of change in the electrical potential is greater than the first threshold.

3. The pre-charge system of claim 2, further comprising the instruction set being executable to indicate a fault when the second switch is opened.

4. The pre-charge system of claim 1, further comprising a timer; wherein the instruction set is executable to:
    initiate the timer coincident with activation of the second switch; and
    periodically monitor the electrical potential only when the timer exceeds a time threshold.

5. The pre-charge system of claim 1, further comprising a non-rechargeable electric power source, wherein the non-rechargeable electric power source is electrically connected to the positive bus link and the negative bus link of the high-voltage electric power bus.

6. The pre-charge system of claim 5, wherein the non-rechargeable electric power source comprises one of a fuel cell stack or a photovoltaic panel.

7. The pre-charge system of claim 1, further comprising the instruction set being executable to:
    determine, via a current sensor, an electrical current in the positive bus link;
    determine a time-rate of change in the electrical current; and
    close the first switch when the time-rate of change in the electrical current is less than a current threshold.

8. A pre-charge system for a DC electric power system, the pre-charge system consisting of:
    a high-voltage power bus composed as a positive bus link and a negative bus link, wherein the high-voltage power bus electrically connects to an external bus via the positive bus link and the negative bus link;
    a contactor including a first switch arranged to control electric power through the positive bus link, and a second switch arranged to control electric power through the negative bus link;
    a pre-charge resistor, the pre-charge resistor being arranged in parallel with the second switch;
    a voltage sensor arranged to monitor electrical potential between the positive bus link and the negative bus link; and
    a controller, the controller operatively connected to the first and second switches, and in communication with the voltage sensor;
    wherein the controller includes an instruction set, the instruction set being executable to:
        activate the first switch;
        periodically monitor the electrical potential;
        determine a time-rate of change in the electrical potential; and
        close the second switch when the time-rate of change in the electrical potential is less than a first threshold.

9. The pre-charge system of claim 8, wherein the instruction set is executable to:
    monitor an elapsed time starting from activation of the second switch; and
    open the second switch when the elapsed time from activation of the second switch is greater than a time threshold and the time-rate of change in the electrical potential is greater than the first threshold.

10. The pre-charge system of claim 8, wherein the instruction set is executable to indicate a fault when the first switch is opened.

11. The pre-charge system of claim 8, wherein the controller includes a timer; and wherein the instruction set is executable to:
    initiate the timer coincident with activation of the first switch; and
    periodically monitor the electrical potential only when the timer exceeds a time threshold.

12. The pre-charge system of claim 8, further comprising the instruction set being executable to:
    periodically monitor electrical current;
    determine a time-rate of change in the electrical current; and
    close the first switch when the time-rate of change in the electrical current is less than a current threshold.

13. The pre-charge system of claim 8, wherein the instruction set is executable to:
    monitor, via the timer, an elapsed time starting from activation of the first switch; and open the first switch when the elapsed time from activation of the second switch is greater than a time threshold and the time-rate of change in the electrical potential is greater than the first threshold.

14. The pre-charge system of claim 13, wherein the instruction set is executable to indicate a fault when the first switch is opened.

15. The pre-charge system of claim 8, further comprising a non-rechargeable electric power source, wherein the non-rechargeable electric power source is electrically connected to the positive bus link and the negative bus link of the high-voltage electric power bus; and wherein the non-rechargeable electric power source comprises one of a fuel cell stack or a photovoltaic panel.

16. A method for pre-charging an external electric bus, the method comprising:

arranging a high-voltage power bus including a positive bus link and a negative bus link between a DC power source and the external electric bus, wherein the high-voltage power bus electrically connects to the external bus via the positive bus link and the negative bus link;

arranging a first switch to control electric power through the positive bus link, and arranging a second switch to control electric power through the negative bus link;

arranging a pre-charge resistor in parallel with the first switch;

activating the second switch;

determining an electrical current in the positive bus link;

determining a time-rate of change in the electrical current; and closing the first switch when the time-rate of change in the electrical current is less than a current threshold.

17. The method of claim 16, further comprising:

monitoring an elapsed time starting from the activating of the second switch;

opening the second switch when the elapsed time from activation of the second switch is greater than a time threshold and the time-rate of change in the electrical current is greater than the first threshold; and indicating a fault when the second switch is opened.

18. The method of claim 16, further comprising:

initiating a timer coincident with activation of the second switch; and periodically determining the electrical current only when the timer exceeds a time threshold.

19. The method of claim 16, further comprising:

activating the second switch;

periodically determining the electrical current;

determining a time-rate of change in the electrical current; and closing the first switch when the time-rate of change in the electrical current is less than a current threshold.

20. The method of claim 19, further comprising:

monitoring an elapsed time starting from activation of the second switch;

opening the second switch when the elapsed time from activation of the second switch is greater than a time threshold and the time-rate of change in the electrical current is greater than the current threshold; and indicating a fault when the second switch is opened.

* * * * *